United States Patent [19]

Lenz et al.

[11] Patent Number: 4,885,392

[45] Date of Patent: Dec. 5, 1989

[54] DERIVATIVES OF 1,3-BISSUBSTITUTED 2-PROPANOL CONTAINING AMINO GROUPS, METHODS FOR THEIR PREPARATION AND THEIR USE

[75] Inventors: Rüdiger Lenz, Frankfurt am Main; Gerd Walz, Wiesbaden; Michael Hönel; Peter Ziegler, both of Mainz, all of Fed. Rep. of Germany

[73] Assignee: Hoechst AG, Fed. Rep. of Germany

[21] Appl. No.: 136,813

[22] Filed: Dec. 22, 1987

[30] Foreign Application Priority Data

Dec. 24, 1986 [DE] Fed. Rep. of Germany ....... 3644371

[51] Int. Cl.$^4$ ...................... C07C 91/04; C07C 91/12; C07C 149/18
[52] U.S. Cl. .................................... 564/503; 564/340; 564/346; 564/355; 564/440; 564/443; 564/501; 564/504; 564/505; 564/506
[58] Field of Search ............... 564/503, 501, 504, 505, 564/506, 440, 443, 340, 346, 355

[56] References Cited

U.S. PATENT DOCUMENTS

| | | | |
|---|---|---|---|
| 3,250,330 | 5/1966 | Smith, Jr. | 166/33 |
| 4,101,466 | 7/1978 | McEntire | 564/503 |
| 4,582,938 | 4/1986 | Harwell | 564/503 |

FOREIGN PATENT DOCUMENTS 135330 3/1985 European Pat. Off. .
010844 3/1985 Japan .

OTHER PUBLICATIONS

Chemical Abstracts, "New Fungastatic Compounds", vol. 58, 837g, Zsolnai, 1963.
Derwent Abstract, 1962, vol. 11, pp. 995-1016.

*Primary Examiner*—Paul Lieberman
*Assistant Examiner*—Christine A. Skane
*Attorney, Agent, or Firm*—Bierman and Muserlian

[57] ABSTRACT

Polyamines based on derivatives of 1,3-bissubstituted 2-propanol containing a multiplicity of amino groups, the latter containing at least one primary amino group and additionally further N-basic groupings, prepared by reacting 1,2,3-trisubstituted propane compounds with bis(primary amines) or with monoamines and bis(primary amines).

The polyamines according to the invention are clear to yellowish or yellow products which, at room temperature, form viscous to highly viscous liquids or may be paste-like or wax-like. They may be used, inter alia, advantageously as starting products for the preparation of thermosetting, in particular water-dispersible and cataphoretically depositable binders based on aminourethanes for coating solid substrates, in particular metals.

5 Claims, No Drawings

DERIVATIVES OF 1,3-BISSUBSTITUTED 2-PROPANOL CONTAINING AMINO GROUPS, METHODS FOR THEIR PREPARATION AND THEIR USE

DESCRIPTION

The invention relates to novel polyamines based on derivatives of 1,3-bissubstituted 2-propanol containing a multiplicity of amino groups, the latter containing at least one primary amino group and additionally further N-basic groupings, methods for their preparation and their use as starting products for thermosetting, in particular water-dispersible and cataphoretically depositable binders based on aminourethanes for coating solid substrates, in particular metals.

German Patent No. 2,252,536 describes self-crosslinking binders for cathodic electrophoretic lacquering which have been obtained from a polyurethane resin, which has been produced by reacting epoxide-amine adducts prepared from an organic compound containing epoxy groups with a secondary amine, and a partially blocked polyisocyanate. Primary aliphatic alcohols are preferably used as masking agent. The binders have, however, to be cured in general at relatively high baking temperatures, for example 180° C. In addition, after the baking there is always at least one tertiary amino group present per molecule in the lacquer layer which may have an unfavorable effect on the film properties. Such products can therefore not generally be used in all desired lacquer formulations.

Cathodic electrophoretic lacquers are also described in German Offenlegungsschrift No. 3,311,517 and German Offenlegungsschrift No. 3,311,518 in which polyamines containing at least two primary amino groups are reacted with epoxy resins to form epoxide-amine adducts and the reaction products obtained are reacted with alkylene carbonate to form β-hydroxyurethanes. Although the β-hydroxyurethanes obtained require in general lower curing temperatures than the binders described above, the introduction of the primary amino groups is cumbersome and requires additional process steps.

European Patent Application No. 0,119,769 describes various possibilities of introducing tertiary amino groups into the basic structure of a resin. In addition to the reaction of epoxy compounds with amine components by various methods, the reactions of resins containing α, β-unsaturated carboxyl groups or resins containing carboxyl groups with amine components are described. The compounds obtained are then reacted with alkylene carbonates to form binders containing β-hydroxyurethane groups. During curing, urethane and urea compounds are formed with diols, which are physiologically not quite safe, being split off. A disadvantage of the reaction of epoxy compounds with ketimines is the maintenance of anhydrous conditions during the reaction in order to prevent a premature hydrolysis.

Surprisingly, it has now been found that thermosetting, in particular water-dispersible and cataphoretically depositable binders of the aminourethane type, which have unexpectedly advantageous properties, can be obtained with starting compounds based on derivatives of 1,3-bissubstituted 2-propanol containing a multiplicity of amino groups by reaction with modified cyclic carbonates. These binders and lacquer formulations, lacquers and coatings prepared therefrom, and also methods of preparing them using polyamines of the present invention as starting products are the subject of German Patent Application P No. 3,644,370.0 filed on the same date to which a reference is hereby made The invention therefore relates to derivatives of 1,3-bissubstituted 2-propanol containing amino groups of the formulae (I) and/or (II)

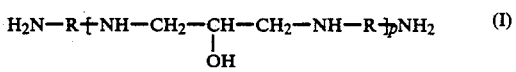

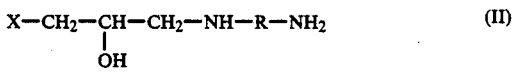

in which:

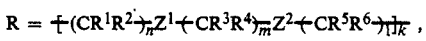

$Z^1$, $Z^2$=O, S, NH, N-alkyl containing up to 8 carbon atoms, N-phenyl, N-mono-, -di- or -trialkylphenyl containing 1 to 4 carbon atoms per alkyl group, a divalent phenylene radical which is optionally substituted, and/or a chemical bond, $R^1$ to $R^6$=H, $CH_3$, $C_2H_5$, phenyl or mono-, di- or trialkylphenyl containing 1 to 4 carbon atoms per alkyl group, n, m, l=0 to 12 preferably 0 to 6, the sum of n+m+l being ≧2, preferably ≧4, k=1 to 6, preferably 1 to 3;

p=1 to 5, preferably 1 or 2;

X=

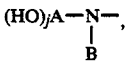

in which A stands for a linear or branched aliphatic radical containing 2 to 5 carbon atoms, j stands for 1 to 5, preferably 1 to 3 and B stands for H, $(C_1-C_4)$alkyl or (HO)jA—,

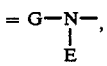

in which G stands for $(C_1-C_{18})$alkyl, preferably $(C_1-C_6)$alkyl, linear or branched, $(C_5-C_9)$cycloalkyl which may be substituted by $(C_1-C_3)$alkyl groups and E stands for H or G, =L, which stands for $(C_2-C_8)$alkoxy, preferably $(C_2-C_6)$alkoxy, linear or branched, or for $(C_5-C_{15})$acyloxy, preferably $(C_{10}-C_{15})$acyloxy.

Preferred polyamines of the above formulae (I) and (II) are those in which in relation to R:

$Z^1$, $Z^2$=O, NH, N—$(C_1-C_6)$alkyl or a chemical bond;

$R^1$ to $R^6$=H, $CH_3$ or $C_2H_5$;

n, m, l=0 to 3;

k=1 to 3, in particular 1, p=1 or 2.

In particular, R is a divalent, preferably nonaromatic hydrocarbon radical containing 1 to 18 carbon atoms, preferably a branched or unbranched alkylene radical containing 2 to 10 carbon atoms, in particular containing 2 to 6 carbon atoms, which may be interrupted by NH groups, or a cycloalkylene radical containing 5 to 12 carbon atoms, preferably 6 to 10 carbon atoms, or an aralkylene radical containing 7 to 12 carbon atoms, preferably 8 to 10 carbon atoms.

As examples of such polyamines (I), mention may be made here of: 1,3-bis(6-aminohexyl)amino-2-propanol, trimethyl-1,3-bis(6-aminohexyl)amino-2-propanol, 1,3-bis(methyl-5-aminopentyl)amino-2-propanol, 1,3-bis-(2-aminoethyl)amino-2-propanol, 1,3-bis(3-aminopropyl)amino-2-propanol, 1,3-bis(5-amino-3-azapentyl)amino-2-propanol.

Typical representatives of formula (II) are for X=

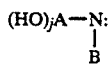

N-[3-(6-aminohexyl)amino-2-hydroxy]propyliminodiethanol, N-[3-(methyl-6-aminopentyl)amino-2-hydroxy]propyliminodiethanol, 2-[3-(6-aminohexyl)amino-2-hydroxy]propyl-2-hydroxymethyl-1,3-propanediol, 2-[3-(methyl-5-aminopentyl)amino-2-hydroxy]propyl-2-hydroxymethyl-1,3-propanediol, 1-(6-aminohexyl)amino-3-[N-methyl-N-(2-hydroxyethyl)]amino-2-propanol, 1-(methyl-5-aminopentyl)amino3-[N-methyl-N-(2-hydroxyethyl)]amino-2-propanol, 1-(6-aminohexyl)amino-3-[N-dodecyl-N-(2-hydroxyethyl)]amino-2-propanol, 1-(methyl-5-aminopentyl)amino-3-[N-dodecyl-N(2-hydroxyethyl)]amino-2-propanol; for X=

1-(6-aminohexyl)amino-3-(2-ethylhexyl)amino-2-propanol, 1-(6-aminohexyl)amino-3-dibutylamino-2-propanol; for X=L: 3-(6-aminohexyl)amino-2-hydroxypropyl 2,2-dimethylundecanoate, and 3-(methyl-5-aminopentyl)amino-2-hydroxypropyl 2,2-dimethylundecanoate, 2,2-dimethylundecanoic acid being understood to mean also the acid mixture such as, for example, its presence in the "Versatic" acids.

The polyamines according to the invention are, in general, low-volatility, clear to yellowish or yellow products which form viscous to highly viscous liquids at room temperature or may be paste-like or wax-like and are relatively readily soluble in water and also in alcohols. Their amine number, which is of importance, for example, when they are used to prepare aminourethanes, is in general between 1400 and 100, preferably between 800 and 200 mg KOH/g.

The invention furthermore relates to the preparation of the polyamines (I) and/or (II).

In this connection, a method for the preparation of the polyamines (I) consists, for example, in reacting bis(primary amines) of the formula (III), $$H_2N-R-NH_2 \qquad (III),$$

in which R has the above meaning, with a propane derivative of the formula (IV)

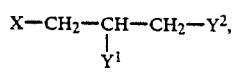

in which

X=halogen, preferably Cl or the p-toluenesulfonate radical, and $Y^1$, $Y^2$=jointly form an epoxy function or are different from each other and $Y^1$ stands for OH and $Y^2$ stands for X, the reaction preferably being carried out at elevated temperatures with inert organic solvents also being used which are not miscible with water and whose boiling points are preferably in the range from 100° to 160° C.

Preferred amines of the formula (III) are ethylenediamine, 1,3-propylenediamine, 1,2-propylenediamine, 1,4-butanediamine, 1,5-pentanediamine, N,N'-dimethyl-N,N'-bis(aminopropyl)ethylenediamine, N-methyldipropylenetriamine, particularly preferred are 1,6-hexanediamine whose methylene groups may be substituted additionally by one or two methyl or ethyl groups such as, for example, trimethylhexamethylenediamine, 2-methylpentanediamine or 2-ethylbutanediamine, and also 6,6'-iminobishexylamine, 4,7-dioxadecane1,10-diamine, 4,9-dioxadecane-1,12-diamine, 4,7,10-trioxatridecane-1,13-diamine, polyoxypropylenediamine (preferably having a mean molecular weight of approx. 200–400), and furthermore diethylenetriamine, dipropylenetriamine and also higher homologous polyamines such as, for example, pentaethylenehexamine, may be employed.

A particularly preferred propane derivative of the formula (IV) is epichlorohydrin.

A method for the preparation of the polyamines (II) with X=

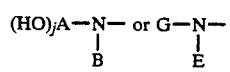

consists in reacting amines of the formula $$X-H \qquad (V),$$

in which X has the above meaning, first with a propane derivative (IV) and then with a bis(primary amine) of the formula (III), the reactions preferably being carried out at elevated temperatures with inert organic solvents also being used which are not miscible with water and whose boiling points are preferably in the range 100° to 160° C.

Preferred amines of the formula (V) are for X=

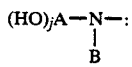

monoethanolamine, diethanolamine, mono-, di-(n or iso)propanolamine, neopentanolamine, methylethanolamine, 2-(2-aminoethoxy)ethanol, 3-aminopropyltrialkoxysilane (alkoxy=methoxy, ethoxy, tridecyloxy), 2-amino-2-hydroxymethyl-1,3-propanediol; for X=

dibutylamine, 2-ethylhexylamine, fatty amines (e.g. tallow oil fatty amine), isononyloxypropylamine, aniline, benzylamine.

A method for the preparation of the polyamines (II) with X=L consists in reacting bis(primary amine) of the formula (III) with a propane derivative of the formula (VI)

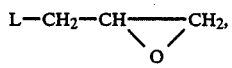 (VI)

in which L has the above meaning, the reaction again being carried out at elevated temperatures with inert organic solvents also being used which are not miscible with water and whose boiling points are preferably in the range from 100° to 160° C.

Particularly preferred compounds of the formula (VI) are the glycidyl ester of Versatic acid and 2-ethylhexyl glycidyl ether and terminal alkylene oxides such as, for example, n-butene oxide or n-octene oxide.

In the above methods, the reaction of the starting components is carried out by usual methods, preferably with inert (i.e. which do not interfere with the reaction) solvents also being used and optionally with atmospheric oxygen being excluded. The reaction may, at the same time, preferably be carried out at elevated temperature, optionally with catalysts also being used, until characteristic reactions of the starting components such as, for example, the epoxide reaction, disappear and/or until the necessary or desired amine number, which can be determined in the usual manner by perchloric acid titration, is achieved in the final product.

The working-up of the reaction mixture is carried out with the elimination of by-products, for example by filtration, extraction and/or distillation, and also optionally with the removal of solvents and also of excess starting components. The latter can frequently be advantageously removed by distillation, with the final product being heated under vacuum to suitable bottom temperatures.

A preferred variant of the method in the preparation of the polyamines according to the invention consists in carrying out the reaction of the starting amines in particular with propane derivatives of the formula (IV) at elevated temperatures with the addition of inert organic solvents whose boiling point at normal pressure is preferably in the range from 100° to 160° C. and which are not miscible with water. Preferred inert solvents are, for example, alcohols which are not miscible with water, preferably n-butanol, or in particular alkylbenzenes, toluene being particularly preferred. The reaction proceeds under these circumstances with continuous stirring in a two-phase system whose aqueous phase is composed essentially of concentrated sodium hydroxide solution. The advantages of this procedure are, inter alia, that the reaction mixture does not undergo any overheating, that the water employed and also the water produced in the reaction can be removed by azeotropic distillation during the working-up of the reaction product, and that if, for example, epichlorohydrin is employed, the NaCl produced can readily be separated off by filtration of the organic solution of the reaction product. Finally, the inert organic solvents can readily be removed from the reaction product by distillation under vacuum.

The polyamines (I)/(II) according to the invention can advantageously be used individually or as mixtures as starting products for the preparation of binders based on aminourethanes, in particular of thermosetting binders, preferably of thermosetting binders dispersed in water and capable of being deposited cataphoretically, which can advantageously be used for coating solid substrates, in particular metallic shaped bodies, preferably of steel sheet and of zinc-bondarized steel.

A subject of the invention is therefore also the use of the amines of the formulae (I) and/or (II) as starting components for the preparation of binders based on aminourethanes.

The invention is explained in more detail by the following examples.

(A) Amine preparation

EXAMPLE 1

Preparation of technical
1,3-bis(6-aminohexyl)amino-2-propanol (polyamine mixture of the formula (I), with $R=(CH_2)_6-$ and $p=1$ and also constituents with $p=2$ as by-product)

463 g (5 mol) of epichlorohydrin are added dropwise at 37° to 42° C. to a mixture of 2325 g (20 mol) of hexamethylenediamine, 2 liters of toluene and 410 g (5.1 mol) of 50% aqueous sodium hydroxide solution in a stirred reactor, which lasts about 2 hours with ice-water cooling. Stirring is continued for 1.5 hours at a maximum of 45° C. and for 20 minutes at 55° C. The water is then continuously removed by azeotropic distillation and, after 5 g of celite has been added at about 95° C., the precipitated common salt is filtered off. Toluene, then at 20 torr at a bottom temperature of up to 150° C. the excess hexamethylenediamine are distilled off from the filtrate. The residue which should be exposed to the air only below 100° C. is a bright yellowish melt which solidifies on cooling to room temperature to a whitish solid and which is the desired abovementioned polyamine mixture of formula (I).

Yield: 1260 g (=87% of theory, referred to epichlorohydrin).

Melting range: 50°–53° C.

Amine number: 782 mg KOH/g (calculated: 779).

Determination of the product distribution:

Hexamethylenediamine and the final products of the Examples 1 and 2 are each reacted with excess ethylene carbonate. The resulting bishydroxyurethanes are analyzed by gel permeation chromatography with the following result:

The final product of Example 1 is composed of
7% by weight of hexamethylenediamine,
70% by weight of compound of the formula (I) with $R=-(CH_2)_6-$ and $p=1$,
23% by weight of a higher-molecular substance which corresponds to the molecular weight according to the compound of the formula (I) with $R=-(CH_2)_6-$ and $p=2$, namely

The recrystallized final product from Example 2 is composed virtually to 100% by weight of the polyamine of the formula (I) with $R=-(CH_2)_6-$ and $p=1$.

EXAMPLE 2

Preparation of pure
1,3-bis(6-aminohexyl)amino-2-propanol (polyamine of the formula (I) with $R=-(CH_2)_6-$ and $p=1$)

Analogously to the specification in Example 1, 2352 g (20 mol) of hexamethylenediamine are reacted with 82 g (1.05 mol) of 50% sodium hydroxide solution and 92.6 g (1 mol) of epichlorohydrin. 275 g of crude product (yield =95.5% of theory) are obtained which is recrystallized from ethyl acetate containing 10% ethanol to produce pure polyamine of the abovementioned formula (I).

Melting point: 53°–55° C.; amine number: 780 mg KOH/g.

Elementary analysis for $C_{15}H_{36}N_4O$ (molecular weight=288.48): Calc. C 62.45% H 12.58% N 19.42% Found C 62.7% H 13.0% N 19.5%

EXAMPLE 3

Preparation of a polyamine mixed compound of the formula (I) with $R=-(CH_2)_6-$ and $-C_6H_9(CH_3)_3-$, p=1–2, (formal designation: trimethyl-1,3-bis(6-aminohexyl)amino-2-propanol).

Analogously to the specification in Example 1, 463 g (5 mol) of epichlorohydrin are added dropwise under nitrogen in the apparatus described in Example 1 to a mixture of 1162 g (10 mol) of hexamethylenediamine, 1582 g (10 mol) of trimethylhexamethylenediamine, 1.5 liters of toluene and 410 g (5.1 mol) of 50% sodium hydroxide solution. The reaction is carried out as described in Example 1 but the amine excess is distilled off at a bottom temperature in the reaction mixture of 175° C. at 20 torr. The residue forms a melt which is whitish, becomes turbid and is slightly syrupy at room temperature and which has an amine number of 680 mg KOH/g. The amine number corresponds to the theory for the desired reaction product. The yield is 1485 g (=90% of theory).

EXAMPLE 4

Preparation of a polyamine mixed compound of the formula (I), with $R=-(CH_2)_6-$, $-C_6H_9(CH_3)_3-$ and $-(CH_2)_6NH(CH_2)_6-$, p=1–2

The preparation is carried out analogously to Example 3, but with 6,6'-iminobishexylamine also additionally being used. In the apparatus of, and according to the specification of, Example 1, a mixture of 344 g (1.6 mol) of 6,6'-iminobishexylamine, 92.9 g (0.8 mol) of hexamethylenediamine and 126.5 g (0.8 mol) of trimethylhexamethylenediamine are reacted under nitrogen in 300 ml of toluene and 66 g (0.82 mol) of 50% sodium hydroxide solution with 74 g (0.8 mol) of epichlorohydrin. The reaction is carried out as described in Example 1 and the amine excess is distilled off at a bottom temperature of up to 80° C. at 20 torr. A substance which is viscous at room temperature and which, in addition to the desired polyamine mixed compound, also contains the unreacted portion of 6,6'-iminobishexylamine but which does not impair the use of the product according to the invention, is obtained as the reaction product.

Yield: 431 g (=86.5% of theory)
Amine number: 705 mg KOH/g (calculated: 720).

EXAMPLE 5

Preparation of 1,3-bis(methyl-5-aminopentyl)amino-2-propanol (polyamine mixture of the formula (I) with $R=-C_5H_9(CH_3)-$, p=1–2)

Analogously to Example 1, 2325 g (20 mol) of 2-methylpentamethylenediamine in 1.5 liter of toluene are reacted with 463 g (5 mol) of epichlorohydrin in the presence of 410 g (5.1 mol) of 50% aqueous sodium hydroxide solution. After the solvent and the excess amine have been distilled off, the desired reaction product is obtained as a pale yellow oil.

Yield: 1300 g (=89% of theory)
Amine number: 783 mg KOH/g (calculated: 779).

EXAMPLE 6

Preparation of 3-(6-aminohexyl)amino-2-hydroxypropyl 2,2-dimethylundecanoate (polyamine of the formula (II) with $R=-(CH_2)_6-$, $L=(C_{10}-C_{15})$acyloxy, branched)

In a stirred apparatus as described in Example 1, 130 g (0.5 mol according to the epoxide content) of commercial "Cardura" E 10 (=glycidyl ester of the commercial "Versatic" acid [according to the total composition, 2,2-dimethylundecanoic acid]) are added dropwise under nitrogen atmosphere to 290 g (2.5 mol) of hexamethylenediamine in 300 ml of toluene at about 50° C. and the mixture is stirred while the reaction continues at a maximum of 70° C. until the epoxide determination is negative. After solvent and amine excess have been distilled off (bottom temperature up to 150° C. at 20 torr), 185 g (=98% of theory) of the desired reaction product is obtained as a yellowish oil.

Amine number: 305 mg KOH/g (calculated: 298).

EXAMPLE 7

Preparation of a polyamine mixed compound of the formula (II) with $R=-(CH_2)_6-$, $-C_6H_9(CH_3)_3-$, $L=(C_{10}-C_{15}$acyloxy, branched.

Analogously to Example 6, 260 g (1 mol) of Cardura E 10 are added dropwise under nitrogen atmosphere to a mixture of 290 g (2.5 mol) of hexamethylenediamine, 360 g (2.5 mol) of trimethylhexamethylenediamine and 600 ml of toluene at about 50° C. and the mixture is stirred while the reaction continues at a maximum of 70° C. until the epoxide determination is negative. After solvent and amine excess have been distilled off (bottom temperature up to 175° C. at 20 torr), 396 g (=virtually 100% of theory) of the desired reaction product is obtained as a yellowish oil.

Amine number: 289 mg KOH/g (calculated: 283).

EXAMPLE 8

Preparation of 3-(methyl-5-aminopentyl)amino-2-hydroxypropyl 2,2-dimethylundecanoate (polyamine of the formula (II) with $R=-C_5H_9(CH_3)-$, $L=(C_{10}-C_{15})$acyloxy, branched).

Analogously to Example 6, 290 g (2.5 mol) of 2-methylpentamethylenediamine in 300 ml of toluene are reacted with 130 g (0.5 mol) of Cardura E 10. The desired reaction product is obtained as a yellowish oil.

Yield: 183 g (=97% of theory)
Amine number: 303 mg KOH/g (calculated: 298).

EXAMPLE 9

Preparation of N-[3-(6-aminohexyl)amino-2-hydroxy]propyliminodiethanol (polyaminopolyol of the formula (II) with $R=-(CH_2)_6-$, $A=-(CH_2)_2-$, j=1, $B=-C_2H_4OH$)

185.2 g (2 mol) of epichlorohydrin are added dropwise at 33°–37° C. in a stirred apparatus under nitrogen atmosphere to 420.6 g (4 mol) of diethanolamine in 240 g of isopropanol and the reaction mixture is kept at this temperature until the epoxide content has dropped to zero. The amine number should not drop below 175 mg KOH/g under these circumstances. The resulting reaction product serves as a "preliminary product" and is added dropwise in a stirred apparatus under nitrogen atmosphere to a mixture of 1392 g (12 mol) of hexamethylenediamine, 1 liter of toluene and 160 g (2 mol) of 50% aqueous sodium hydroxide solution at 38°–42° C. After the reaction has stopped, isopropanol/water, then isopropanol/toluene are distilled out up to the boiling point of toluene, the precipitated NaCl is filtered off and the remaining toluene and the amine excess are removed by distillation up to a bottom temperature of 150° C. at 20 torr. 982 g (=88.6% of theory) of the desired reaction product are left as a yellow oil. Amine number: 590 mg KOH/g (calculated: 607).

EXAMPLE 10

Preparation of a polyaminopolyol of the formula (II) with R=—(CH$_2$)$_6$—, —C$_6$H$_9$(CH$_3$)$_3$—, A=—(CH$_2$)$_2$—, j=1, B=—C$_2$H$_4$OH Analogously to Example 9, the "preliminary product" from Example 9 is added dropwise to a mixture of 696 g (6 mol) of hexamethylenediamine and 948 g (6 mol) of trimethylhexamethylenediamine in 1 liter of toluene and 160 g (2 mol) of 50% sodium hydroxide solution in the appropriate receptacle at 38°–42° C. The reaction mixture is worked up as described in Example 9 and finally distilled up to a bottom temperature of 175° C. at 20 torr. 977 g (=82% of theory) of the desired reaction product are obtained as an orange-colored oil. Amine number: 535 mg KOH/g (calculated: 564).

Example 11

Preparation of N-[3-(methyl-5-aminopentyl)amino-2-hydroxy]-propyliminodiethanol (polyaminopolyol of the formula (II) with R=—C$_5$H$_9$(CH$_3$)—, A=—(CH$_2$)$_2$—, j=1, B=—C$_2$H$_4$OH)

Analogously to Example 9, the "preliminary product" from Example 9 is added dropwise to a mixture of 1392 g (12 mol) of 2-methylpentamethylenediamine in 1 liter of toluene and 160 g (2 mol) of 50% sodium hydroxide solution in the appropriate receptacle at 38°–42° C. and the subsequent procedure is as described in Example 9. Finally, 985 g (=89% of theory) of the desired reaction product is obtained as a yellow oil. Amine number: 593 mg KOH/g (calculated: 607).

EXAMPLE 12

Preparation of 2-[3-(6-aminohexyl)amino-2-hydroxy]propyl-2-hydroxymethyl-1,3-propanediol (polyaminopolyol of the formula (II) with R=—(CH$_2$)$_6$—, B=H, A=branched C$_4$-alkyl, j=3)

121.2 g (1 mol) of Tris buffer (=Tris(hydroxymethyl)methanamine) are boiled in 400 g of methanol under reflux and at the same time 92.5 g (1 mol) of epichlorohydrin are added in the course of 30 minutes. Stirring is continued for a further approx. 50 minutes at 60° C. until the epoxide determination results in the Value zero, but the amine number does not fall below 90 mg KOH/g. The resulting reaction product is used as "preliminary product" and is added dropwise in a stirred apparatus under nitrogen atmosphere at 38°–42° C. to a mixture of 696 g (6 mol) of hexamethylenediamine and 40 g (1 mol) of sodium hydroxide in 300 ml of methanol. The methanol is then distilled off, 600 ml of toluene are added and the reaction water is distilled off azeotropically. Then the precipitated NaCl is filtered off, and the toluene and the amine excess are removed by distillation (bottom temperature up to 150° C. at 20 torr). 230 g (=78% of theory) of the desired reaction product are left behind as a yellowish oil.

Amine number: 560 mg KOH/g (calculated: 574).

EXAMPLE 13

Polyaminopolyol of the formula (II) with R=—(CH$_2$)$_6$—, —C$_6$H$_9$(CH$_3$)$_3$—, B 32 H, A=branched C$_4$-alkyl, j=3

Analogously to Example 12, the "preliminary product" from Example 12 is added dropwise to the prepared mixture of 348 g (3 mol) of hexamethylenediamine and 474 g (3 mol) of trimethylhexamethylenediamine in 40 g (1 mol) of sodium hydroxide in 300 ml of methanol. After the reaction mixture has been worked up analogously to Example 12 and distillation has been carried out up to a bottom temperature of 175° C. at 20 torr, 249 g (=79% of theory) of the desired reaction product are left behind as a yellowish oil.

Amine number: 528 mg KOH/g (calculated: 536).

EXAMPLE 14

Preparation of 2-[3-(methyl-5-aminopentyl)amino-2-hydroxy]-propyl-2-hydroxymethyl-1,3-propanediol (polyaminopolyol of the formula (II) with R=—C$_5$H$_9$(CH$_3$)—, B=H, A=branched C$_4$-alkyl, j=3)

Analogously to Example 12, the "preliminary product" from Example 12 is added dropwise to the prepared mixture of 696 g (6 mol) of 2-methylpentamethylenediamine in 40 g (1 mol) of NaOH in 300 ml of methanol. After the reaction mixture has been worked up analogously to Example 12 and distillation has been carried out up to a bottom temperature of 150° C. at 20 torr, 235 g (=80% of theory) of the desired reaction product are left behind as a yellowish oil.

Amine number: 562 mg KOH/g (calculated: 574).

We claim:

1. A derivative of 1,3-bissubstituted-2-propanol containing amino groups of the formula (I)

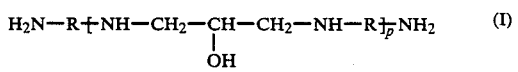

in which:

in which

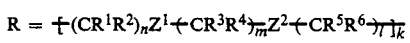

$Z^2$=O, S, NH, N-alkyl containing up to 8 carbon atoms, N-phenyl, N-mono-, di- or -trialkyl phenyl containing 1 to 4 carbon atoms per alkyl group, and/or a chemical bond, $R^6$ to $R^6$ =H, CH$_3$, C$_2$H$_5$, phenyl or mono-, di- or trialkyl-phenyl containing 1 to 4 carbon atoms per alkyl group, n, m, l=0 to 12, the sum of n+m+l being >4 k=1 to 6, p=1 to 5.

2. A derivative containing amino groups as claimed in claim 1, wherein, in the formula (I):

$Z^1$, $Z^2$=O, NH, N-(C$_1$–C$_6$)alkyl or a chemical bond;

$R^1$ to $R^6$ = H, $CH_3$ or $C_2H_5$;
n, m, l = 0 to 6;
k = 1 to 3, especially
p = 1 or 2.

3. A derivative containing amino groups as claimed in claim 1, wherein R stands for a divalent hydrocarbon radical containing 1 to 18 carbon atoms which may be interrupted by NH groups.

4. A derivative containing amino groups as claimed in claim 3, wherein R stands for a radical from a compound of the group comprising 1,6-hexanediamine whose methyl groups are optionally substituted additionally by one or two methyl or ethyl groups, trimethylhexamethylenediamine, 2-methylpentanediamine, 2-ethylbutanediamine, 6,6'-iminobishexylamine, 4,7-dioxadecane-1,10-diamine, 4,9-dioxadecane-1,12-diamine, 4,7,10-trioxatridecane-1,13-diamine or polyoxypropylenediamine with a mean molecular weight of approx. 200 –400.

5. A derivative containing amino groups as claimed in claim 1, wherein p in formula (I) denotes 1 or 2.

* * * * *